United States Patent
Brand

[11] 3,752,182
[45] Aug. 14, 1973

[54] PRESSURE COMPENSATED FLOW CONTROL VALVE

[76] Inventor: Glen Brand, 4114 N. 79th St., Omaha, Nebr.

[22] Filed: Apr. 21, 1971

[21] Appl. No.: 135,878

[52] U.S. Cl. .............................. 137/504
[51] Int. Cl. ............................. F16k 31/12
[58] Field of Search ..................... 137/504

[56] References Cited
UNITED STATES PATENTS

| 3,145,730 | 8/1964 | Presnell | 137/504 X |
| 3,120,243 | 2/1964 | Allen et al. | 137/504 |
| 3,130,747 | 4/1964 | Benaway | 137/504 |
| 2,845,087 | 7/1958 | Thomas | 137/504 |
| 3,015,341 | 1/1962 | Hedland et al. | 137/504 X |
| 3,339,580 | 9/1967 | Cutler et al. | 137/504 |
| 3,381,708 | 5/1968 | Chenoweth | 137/504 |

*Primary Examiner*—Henry T. Klinksiek
*Attorney*—Henderson & Strom

[57] ABSTRACT

A valve for regulating the volume of fluid flow through a fluid line by the automatic movement of a cylindrical piston within a cylinder, the piston having an orifice in its one end and a plunger slidably disposed in its other end, the automatic movement being brought about by a pressure differential across the orifice and the regulation of flow being accomplished by the movement of the piston relative to the plunger.

2 Claims, 4 Drawing Figures

Patented Aug. 14, 1973

INVENTOR.
GLEN BRAND

BY

Henderson & Strom

Patented Aug. 14, 1973

INVENTOR.
GLEN BRAND

BY
Henderson & Strom

PRESSURE COMPENSATED FLOW CONTROL VALVE

BACKGROUND OF THE INVENTION

It is a well known principle that an increase in the velocity of fluid flow results in a corresponding decrease in pressure. This principle has been employed in various types of flow control valves wherein the increase of velocity is caused by a flow-restricting piston, the resulting pressure differential causing the piston to move against a bias to a new position wherein the flow of fluid is further restricted, the degree of restriction varying with the degree of movement and hence the degree of pressure differential. The volume of fluid flow through the valve is thus limited to a determined amount, the amount being dependent upon such factors as size of restriction, size of piston and degree of bias.

The resultant force acting to move the piston is a product of the pressure differential and the area of the piston on which the force is exerted.

A piston having a larger area will require a smaller pressure differential to be moved against a given bias than will a piston having a smaller area; thus it will be more sensitive and provide greater accuracy in controlling the flow of a fluid. Further, the use of a larger piston allows the use of a biasing spring having greater strength, thus eliminating the sticking of a piston or the hanging-up of a piston due to contamination of the fluid.

Thus far, most of the flow control valves that have been developed provide for the regulation of the fluid flow by metering the fluid between the outer diameter of the movable piston and a variable restriction, the piston necessarily having a smaller diameter than that of the restriction. Other devices provide for the metering by alternate methods, but none provides for the metering by the inner diameter of the piston while exposing the largest cross-sectional surface of the movable piston to the inflow of the fluid.

SUMMARY OF THE INVENTION

This invention relates generally to a flow control valve and more particularly to a pressure compensated flow control valve which meters the fluid flow to a predetermined volume by the automatic positioning of a cylindrical piston relative to a plunger slidably disposed inside its outlet end. The piston has an orifice formed in its inlet end for the admission of fluid therethrough, and a spring disposed between the plunger and the orifice wall to bias the piston away from the plunger in a direction opposite to that of the fluid flow. A portion of the piston near its outlet end, has a reduced outside diameter thereby providing a cavity between its outer wall and the cylinder inner wall. A plurality of radially disposed inlet ports formed in the wall provide fluid communication between the inner side of the piston and the cavity, the cavity also fluidly communicating through a plurality of radial outlet ports, to a central recess in the end of the plunger, and hence to the valve outlet.

Fluid passes from the inlet, through the orifice and into the inner side of the piston where it is then directed through the inlet ports to the cylinder cavity, through the outlet ports, into the plunger recess and hence to the outlet. The position of the outlet end of the piston relative to the outlet ports, and the relative overlapping thereof, provides the necessary metering to limit the flow of fluid, the relative position being regulated by a differential pressure across the orifice. When the pressure on the inlet side of the orifice wall sufficiently exceeds that on the opposite side thereof, the piston will move against the bias thereby proportionately restricting the outlet ports and hence reducing the fluid flow to the outlet.

The greatest diameter of any point on the length of the piston is at the orifice wall, that diameter being substantially that of the greatest inside diameter of the cylinder. Thus, for a given cylinder size, the orifice wall has a maximum diameter, resulting in increased efficiency and accuracy.

It is therefore an object of this ivnention to provide a new and improved pressure compensated flow control valve.

Another object of this invention is the provision in a flow control valve for automatically regulating the volume of fluid flow from a fluid supply to a fluid operated translating device.

A further object of this invention is the provision for a flow control valve having a housing with inlet and outlet ports and means within the housing to control communication between the inlet and outlet ports, such means being controlled by a fluid pressure differential acting on a biased piston reciprocally disposed therein.

Yet another object of this invention is the provision for a piston operated flow control valve, which presents, for a given housing size, a maximum surface area on which the pressure differential acts, thereby insuring greater sensitivity to pressure changes within the fluid flow.

Still another object of this invention is the provision in a flow control valve having a pressure operated reciprocal piston disposed therein, for biasing means with sufficient strength to overcome the affect of fluid contained debris, while presenting limited opposition to the movement of the piston by a fluid pressure differential.

Another object of this invention is the provision for a piston operated flow control valve wherein the piston comprises a cylindrical section having a plunger slidably disposed in one end thereof, and the relative position therein determines the amount of fluid flow through the valve.

Yet a further object of this invention is to provide a flow control valve wherein, in the manufacture thereof, the the main housing or cylinder is open ended to permit through reaming or honing, which gives more accuracy and less expensive construction.

A still further object of this invention is the provision for a flow control valve which is economical to manufacture, extremely functional in use and durable in service.

These objects and other features and advantages become more readily apparent upon reference to the following description when taken in conjunction with the appended drawings.

In the drawings as hereinafter described, a preferred embodiment and a modified embodiment are depicted; however, various other modifications and alternate constructions can be made thereto without departing from the true spirit and scope of the invention.

DESCRIPTION OF THE PREFERRED EMBODIMENT

Figure 1:
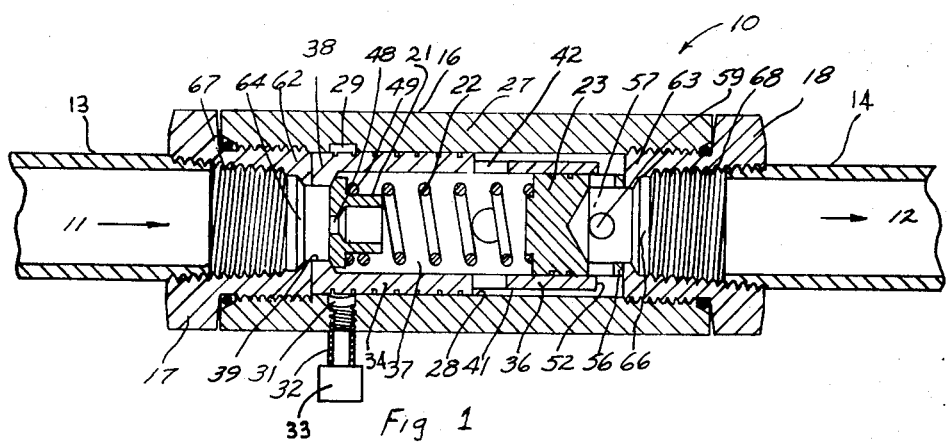
FIG. 1 is a longitudinal cross-sectional view of the preferred embodiment of the valve as installed in a hydraulic conduit.
Figure 2:
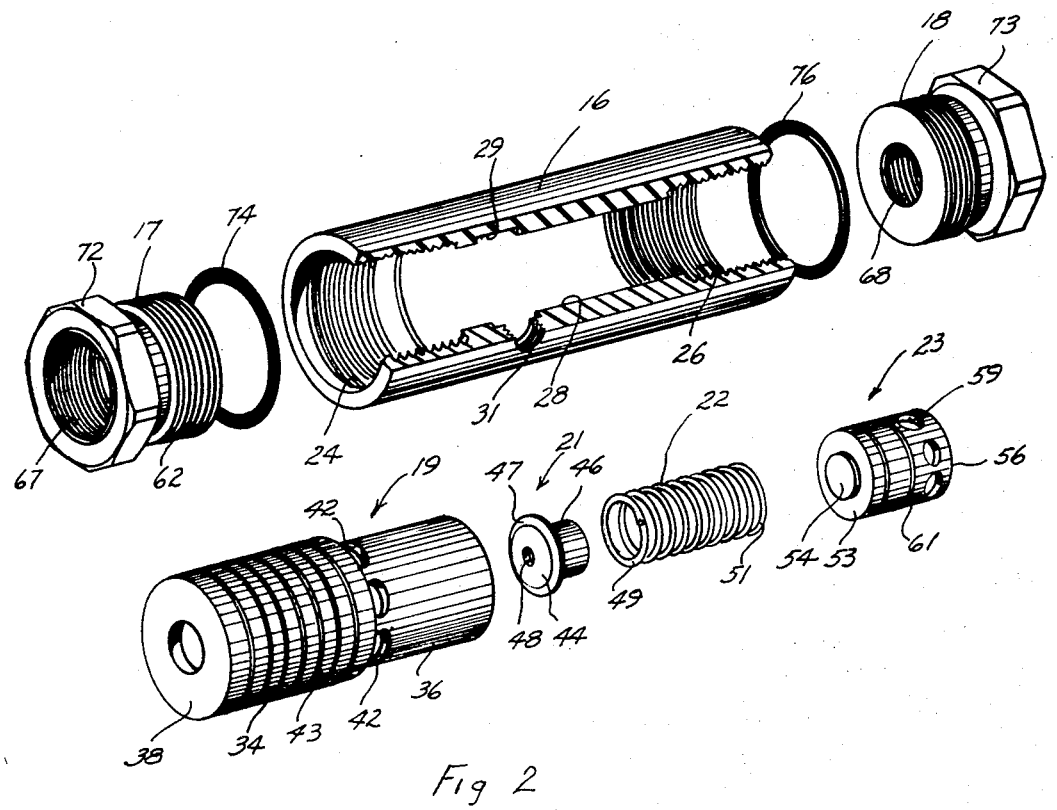
FIG. 2 is an exploded perspective view thereof with a portion cut away to more clearly indicate details of the housing.

Referring to the drawings and in particular to FIGS. 1 and 2, the flow control valve of the invention is indicated generally at 10. The valve 10 has an inlet end 11 and an outlet end 12 to which are fluidly connected a fluid source conduit 13 and a hydraulic delivery conduit 14, respectively. The valve 10 is adapted to receive a variable fluid flow at its inlet end 11 and to automatically limit to a predetermined volume the amount which flows therethrough to the outlet end 12.

The valve 10 (FIGS. 1 and 2) comprises a hollow cylindrical housing 16 having inlet and outlet plugs 17 and 18 threadably disposed in the ends thereof, and a movable piston 19, a stopper 21, a helical coil spring 22 and a plunger 23, all of which are disposed between the plugs 17 and 18. Each of these elements will be described more fully hereinafter.

The housing 16 (FIG. 2) is tapped at both ends to provide internal threads 24 and 26 at the inlet end 11 and the outlet end 12 respectively, for threadably receiving the plugs 17 and 18. Although the drawings provide for internal mounting of the plugs, the housing and plugs could readily be redesigned to permit external mounting of the latter. The area of the housing between the tapped ends, defined as the central portion 27, has a smooth internal surface 28 adaptable to slidably receive the piston 19 therein. Formed in the central portion 27 proximate the internal threads 24 and communicating with the interior of the housing is an annular indent 29. An auxiliary port 31 is formed radially through the housing to communicate with the indent and its outer end is threaded to receive an auxiliary conduit 32. The purpose of the port and indent will be described hereinafter.

Slidably disposed in the housing central portion 27 is the piston 19 which comprises a hollow cylindrical first portion 34 and second portion 36 that are coaxially aligned and integrally connected to form an internal bore 37 having a constant diameter. The first portion 34, disposed nearer the inlet end 11, has an outer diameter slightly smaller than that of the inner diameter of the housing central portion 27, thereby providing a close, slidable piston-cylinder relationship. A plurality of spaced annular grooves 43 is formed on the periphery of the first portion 34 to aid in the lubrication between the sliding parts, but are not a necessary part of this invention. At the free end of the first portion 34 is a wall 38 integral with and covering the end thereof and having an orifice 39 formed axially therethrough. The second portion 36 is turned to provide an outer diameter smaller than that of the larger portion 34 thereby providing a cavity area 41 between the second portion 36 outer surface and the central portion internal surface 28. Formed radially through the walls of the smaller portion 36 proximate the end which is integral with the first portion, is a plurality of equally spaced inlet ports 42 extending therethrough.

Removably disposed in the internal bore 37 (FIGS. 1 and 2) is the stopper 21 having a flat circular base 44 with an annular collar 46 integral therewith and projecting normally therefrom. It will be noted that the collar 46 is spaced inwardly of the periphery of the base 44 to provide a seat for the spring 22. The flat base 44 has on its side opposite the collar 46 a slight chamfer 47 around its edge, the chamfered surface being adapted to engage the inner side of the wall 38 around the orifice 39. Formed axially through the base 44 is an aperture 48. The stopper 21 is not a necessary component of the valve, since the orifice 39 wil cause an increase in velocity and a corresponding decrease in pressure to move the piston; however, the stopper 21 is provided to further decrease the pressure by introducing the aperture 48, and by the selective interchanging of stoppers having different sized apertures, the operating characteristics of the valve may be readily changed.

The helical coil spring 22 is disposed substantially concentrically in the internal bore 37 with its one end 49 abutting one side of the stopper base 44 and its other end 51 extending along the internal bore 37, well beyond the inlet ports 42, but not beyond the free end 52 of the piston second portion 36. The spring one end 49 is disposed around the stopper collar 46 so as to maintain the stopper in a substantially concentric position relative to the internal bore 37, to maintain uniform contact between the stopper chamfer 47 and the wall 38 and to bias the piston 19 toward the inlet end 11.

Disposed against the spring other end 51 is the plunger 23, having a diameter slightly less than that of the internal bore 37 and being slidably disposed therein. The plunger 23 is cylindrical in form, having at its one end 53 a projecting central stem 54 which in combination with the plunger one end 53 provides a seat for the spring other end 51, and at its other end 56 a recess 57 is formed therein which extends along its central axis to substantially intermediate the ends 53 and 56. Formed in the wall of the plunger 23 near its one end 56 is a plurality of outlet ports 59 fluidly connecting the central bore cavity 41 with the plunger recess 57. The ports 59 are radially spaced at equal intervals around the plunger wall to maintain a required balance. The length of the plunger is such that, when the spring 22 is in its installed position, the ports 59 will be disposed outside of the piston central bore 37, but as the piston 19 moves against the bias of the spring 22 and thereby compresses it, the piston 19 will slide toward the exhaust end to a position wherein the ports 59 could be fully covered, thus closing the passage between the central bore 37 and the cavity 41. A plurality of annular grooves 61 are provided around the periphery of the plunger to provide lubrication in the same manner as the grooves 43 provide lubrication for the piston 19.

Threadably disposed in the ends of the housing 16 are the substantially identical inlet plug 17 and outlet plug 18 respectively, the former having its shank end 62 normally abutting the piston wall 38 when there is no flow through the valve, and the latter having its shank end 63 abutting the plunger end 56. Central passages 64 and 66 are formed in the plugs 17 and 18 respectively, their axes being coincident with that of the central bore 37. The plugs have internal threads 67 and 68 formed therein for receiving conduits 13 and 14, and fluidly connect the latter with the orifice 39 and plunger recess 57 respectively. Hexagonal flanges 72 and 73 are provided on the outer ends of the respective plugs 17 and 18 to facilitate assembly and disassembly, and annular seals 74 and 76, of a resilient material such as rubber or the like, are provided to seal the union between the plugs and the housing 16.

Figure 3:
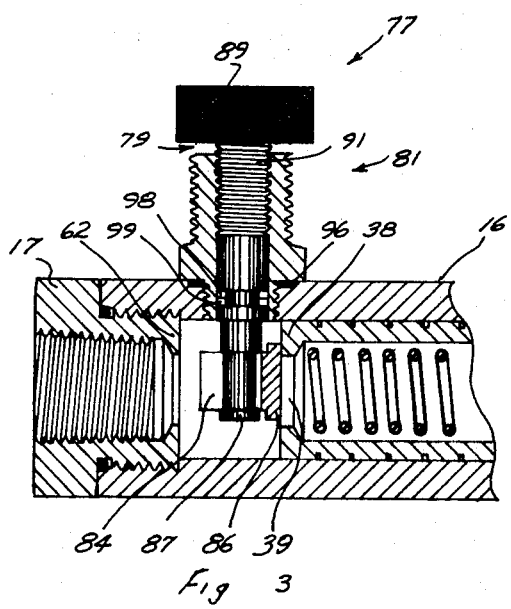
FIG. 3 is a partial longitudinal cross-sectional view showing the variable orifice mechanism in the modified embodiment.
Figure 4:
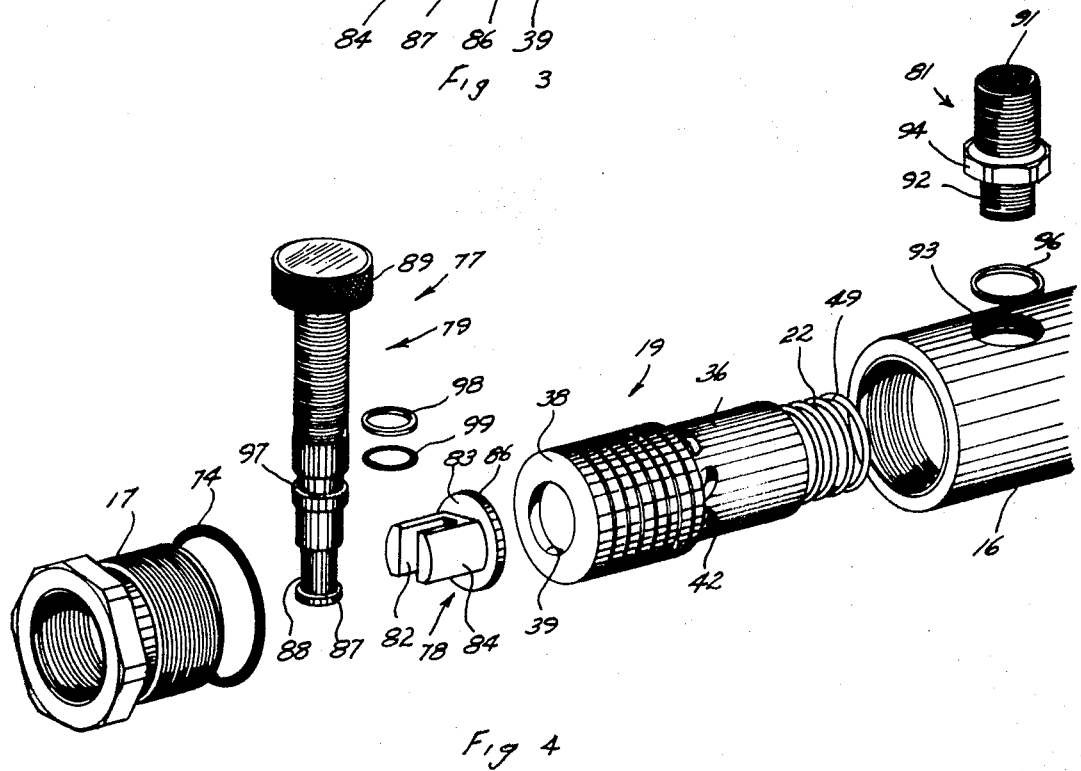
FIG. 4 is an exploded perspective view of the variable orifice mechanism in the modified embodiment.

Directing attention to the modification depicted in FIGS. 3 and 4, the components are essentially identical to those described in the preferred embodiment, however the stopper 21 is omitted and the spring end 49 abuts directly against the inside of the piston wall 38. However, the inlet plug shank end 62 does not engage the piston wall 38 as in the preferred embodiment but an orifice control unit 77 is disposed therebetween. The unit 77 comprising in combination, a gate 78, a stem 79 and a securing collar 81. The gate 78 is an elongate cylinder having an axially disposed vertical slot 82 cut therein from one end, thus leaving a flat disc-like wall 83 having vertically disposed bifurcations 84 extending normally therefrom. The head surface 86, opposite the side of the bifurcations 84 is slidably justaposed against the outer piston wall 38 to cover the orifice 39, and is adapted to slide radially so as to variably expose a portion of the orifice 39 to the incoming fluid and to slide axially to maintain contact with the piston outer surface 38.

The stem 79 (FIG. 4) is an elongate rod having near its one end 87 an annular indent 88, which is adapted to seat in the gate slot 82. Disposed on the stem opposite end is a knurled knob 89 to facilitate the turning thereof, and between the knob 89 and the indent 88, the shank of the stem is threaded to threadably engage the securing collar 81.

The securing collar 81 (FIG. 4) is a hollow cylinder having internal threads 91 adapted to threadably receive the stem 79 and having external threads 92 on the lower end thereof adapted to threadably extend through an aperture 93 radially formed in the wall of the housing 16. Intermediate the ends of the securing collar 81 is a hexagonal flange 94 to facilitate the turning of the collar, and disposed between it and the periphery of the housing 16, around the aperture 93, is an annular seal 96 of plastic or the like. The collar 81 is securely installed in the aperture 93 and the stem 79 is designed to be adjustably moved therein, thereby causing the gate 78 to move relative to the orifice 39, and hence adjusting the size of the restriction through which the fluid flows. As the piston moves, the gate 78 maintains its contact therewith by sliding on the stem in a direction normal to the axis thereof.

An annular groove 97 is formed in the stem above the indent 88, and receives a back up ring 98 and an O-ring 99 as seals between the stem 79 and the collar 81.

Referring again to the preferred embodiment 10 (FIGS. 1 and 2) the operation of the valve is as follows: Fluid flows into the inlet end 11, through the orifice 39 and the stopper aperture 48, into the internal bore 37. The fluid then passes through the piston second portion inlet ports 42, into the cavity 41, back through the plunger outlet ports 59, into the plunger recess 57, and hence to the outlet end 12. When the amount of fluid flow passing through the aperture 48 exceeds a predetermined volume; the pressure differential between the inlet end and the internal bore 37 and cavity 41 pushes the stopper 21 against the bias of the spring 22 and permits the piston 19, by action of the fluid on the piston outer wall 38, to also move toward the outlet end 12, thereby causing the piston free end 52 to extend over the outlet ports 59, thus reducing the amount of fluid flow to the outlet end 12 to a predetermined amount. As the volume of fluid decreases across the aperture 48, a corresponding pressure differential decrease will occur and the spring 22 will cause the piston 19 to move toward the inlet plug 17, thereby increasing the opening provided between the ports 59 and the piston free end 52 to allow more fluid to flow to the outlet end 12, again adjusting flow to a predetermined amount.

In addition, as the piston 19 moves against the spring, the outer surface of its wall 38 soon reaches the annular indent 29, wherein the indent will communicate directly with the inlet 11. Fluid will then pass through the auxiliary port 31 into the auxiliary conduit 32 and hence to a hydraulic component 33 where its hydraulic power may be utilized. As the pressure differential across the orifice 48 is reduced, the spring 22 will cause the piston 19 to return toward its original position and the fluid flow to the indent 29 will be temporarily reduced until there is a temporary increase in flow to the inlet 11.

Thus it will be noted that by changing the size of the aperture 48 by replacement of the stopper 21, any predetermined amount of flow through the valve can be obtained. If the flow through the valve is constant, the piston will remain stationary, however a change in the flow rate will cause the piston to seek a new position. Surging pressures will cause the piston to flutter, but always with the purpose of maintaining a constant predetermined flow through the outlet end 12 of the valve.

In the modified embodiment, the regulation of the desired predetermined flow is provided by the orifice control unit 77. Adjustment of the position of the gate across the outer piston wall 38 thus provides a variable size piston orifice 39.

The preferred and modified embodiments of this valve therefore provide either a two-port adjustable or non-adjustable pressure compensated flow control, or a three-port adjustable or non-adjustable pressure compensated flow control. If the auxiliary port of the three-port valve is not required, it can be plugged by a plug or the like. Furthermore, the non-adjustable valve is adjustable by merely changing the orifice 48 by stopper replacements.

I claim:

1. A fluid flow control valve comprising:

a hollow housing having an interior wall, an exterior wall, an inlet end and an outlet end;

a hollow piston slidably disposed in said housing and having an orifice wall closing one end thereof, said orifice wall disposed proximate said inlet end and having an orifice formed therethrough fluidly communicating said inlet end with the interior of said piston, said piston other end having an outer diameter of smaller dimension than said piston one end outer diameter thus forming a cavity area between said piston other end and said housing interior wall, said piston other end having a plurality of spaced inlet ports formed radially therein thereby fluidly connecting said piston interior with said cavity area, said orifice wall having an outer side and an inner side with said outer side facing said housing inlet end and said inner side facing said housing outlet end;

a plunger slidably disposed in said piston other end, said plunger being imperforate axially and having a recess formed axially in one end thereof in fluid communication with said housing outlet end, said plunger one end having a plurality of spaced outlet ports formed radially therein for fluidly connecting said recess with said cavity area;

a stopper disposed in said piston and against said orifice wall inner side wherein said orifice is closed, said stopper having an aperture formed axially therethrough to fluidly connect said housing inlet end with said piston interior; and a spring disposed in said piston interior between said stopper and said plunger for biasing said stopper against said orifice wall inner side and said piston toward said housing inlet end;

wherein, when the volume of fluid passing through said aperture reaches a predetermined amount the pressure differential thereacross will cause said piston to slide on said plunger against said spring toward said housing outlet end thereby causing said piston other end to restrict said plunger outlet ports and thus reduce the flow of fluid through said housing outlet end.

2. A flow control valve as defined in claim 1 and including an annular indent formed in said housing interior wall proximate said outlet end and an auxiliary port drilled radially through said housing and fluidly communicating with said indent, said indent being closed by said piston when said piston is biased toward said housing inlet end.

* * * * *